Figure 1:
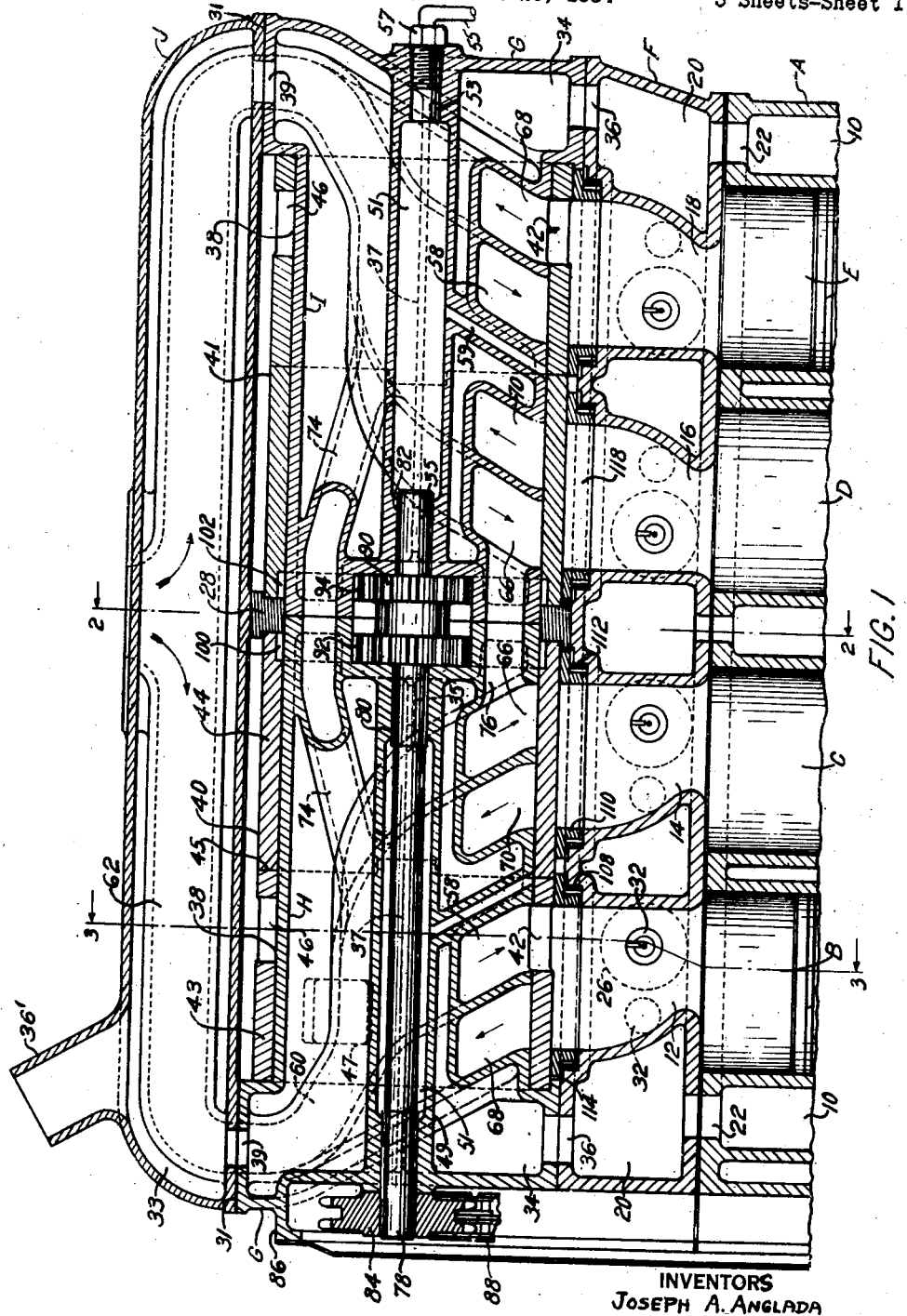

March 1, 1938.  J. A. ANGLADA ET AL  2,109,608
INTERNAL COMBUSTION ENGINE
Filed Oct. 25, 1934  3 Sheets-Sheet 2

INVENTORS
JOSEPH A. ANGLADA
AXEL H. ASPROOTH
BY
Hammond Littell
ATTORNEYS

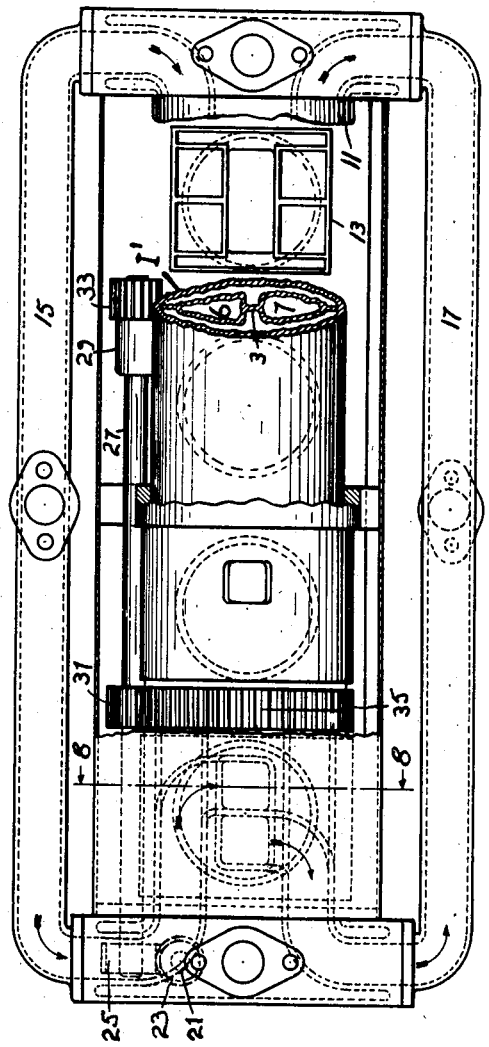
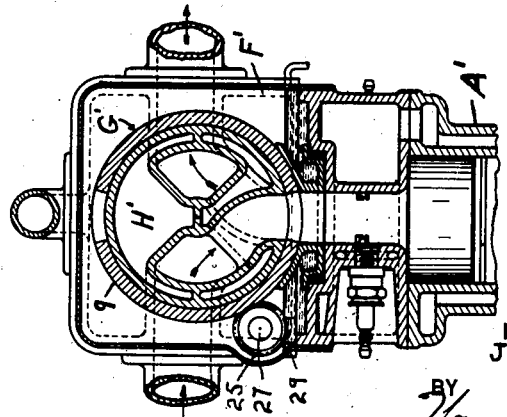

Patented Mar. 1, 1938

2,109,608

UNITED STATES PATENT OFFICE 2,109,608

INTERNAL COMBUSTION ENGINE

Joseph A. Anglada and Axel H. Asprooth, New York, N. Y., assignors to Anglada Motor Corporation, New York, N. Y., a corporation of Delaware Application October 25, 1934, Serial No. 749,888

19 Claims. (Cl. 123—190)

The present invention relates to valve mechanisms of the rotary sleeve type adapted for use in connection with internal combustion engines, compressors and other fluid actuated motors. More specifically the invention, relates to a valve mechanism of the type referred to and its adaptation to the ordinary type of internal combustion engine. The invention therefore includes not only the valve structure itself, but its relation to the rest of the engine. The valve itself, its position with respect to the remainder of the combustion engine, the manner in which it is supported in and driven by the engine, its lubrication, its cooling, the manner in which it controls the distribution of pressure fluid to the cylinder and the exhaust of gases therefrom, the elimination of pressure losses in the combustion system, and many other features or auxiliary instrumentalities which modify the action of the valve or in any way effect its operation or make possible the ultimate result obtained, are the subject matter of the present invention.

The principal object of the present invention is to provide a valve mechanism in which a single open ended tubular valve, rotating in phase with the crankshaft of the engine, and having its axis parallel or at an angle to the same, controls the admission of pressure fluid to, and the exhaust of spent gases from, the combustion chamber or chambers, of one or more cylinders of an internal combustion engine, compressor or other fluid actuated motor.

Another object of the invention is to provide a valve mechanism which is comprised of a minimum number of parts, especially movable ones, which parts are extremely simple in their design and which consequently may be manufactured economically and assembled readily. This object therefore embraces the provision of a valve structure which is simple, rugged and durable and which consequently is unlikely to get out of order, but which in an emergency may be quickly disassembled, repaired and reassembled with the minimum amount of labor. By thus providing a structure of simple design, many features of economy result. The simplicity of machined parts result in low initial cost while the ruggedness and durability of the assembled structure greatly lowers the cost of upkeep and repair.

Another object of the invention is the provision of a valve mechanism which is adequately cooled and lubricated and in which the mechanical and thermal stresses are low, thus permitting long periods of high speed, maximum power operation without overheating. In carrying out this latter object the parts which are normally subjected to the greatest heat are given the benefit of the greatest cooling effect in order that this heat may be rapidly conducted away to insure even temperatures throughout which are far below the critical range of temperature.

Still another object of the invention is to provide a valve mechanism in which the exhaust and intake passages from the external manifolds are of the desired size and shape that the highest volumetric efficiency obtainable may be maintained throughout the entire speed range of the engine and regardless of the load imposed.

A further object of the invention is the provision of an efficient high pressure sealing means on the outer surface of the valve adjacent and surrounding the opening leading to the combustion chamber controlled by such valve. The provision of such high pressure sealing means operates to reduce the pressure loss by application of fluid pressure around the valve in such a manner that the sealing means will become increasingly effective when higher pressures are generated in the combustion chamber. A further object of the invention is to provide a ported tubular valve, a cylindrical core forming the main support of said valve and having port openings with which the ports of the valve register during operation together with means for pressing the tubular valve against the core adjacent the point of registry of the port openings to provide a sealing contact around the port openings in the core.

The elimination of adjustments; initial and continued silent operation; smooth operation by virtue of freedom from vibration regardless of the load or speed; maximum power, minimum fuel consumption; and a high compression ratio with resultant high thermal efficiency and low mechanical losses, are further desiderata that have been borne in mind in the production and development of the present engine.

Figure 2:
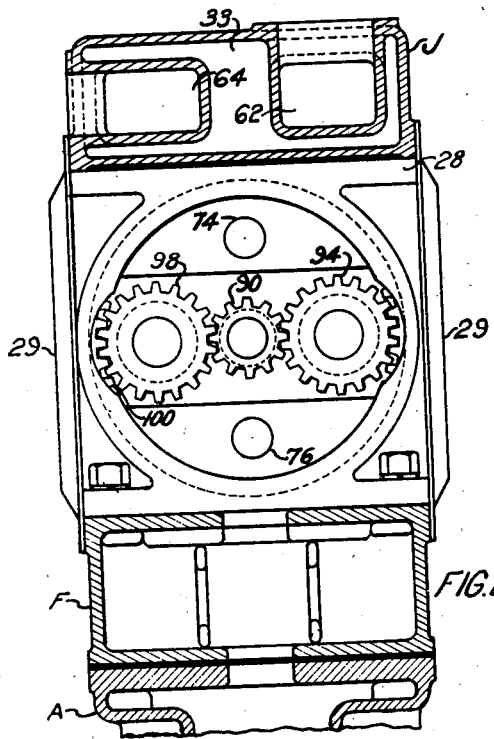
Figure 6:
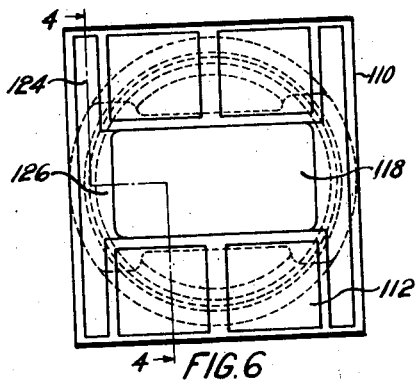
Figure 5:
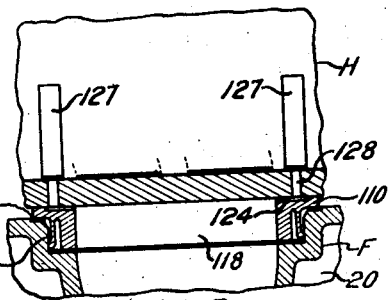
Figure 3:
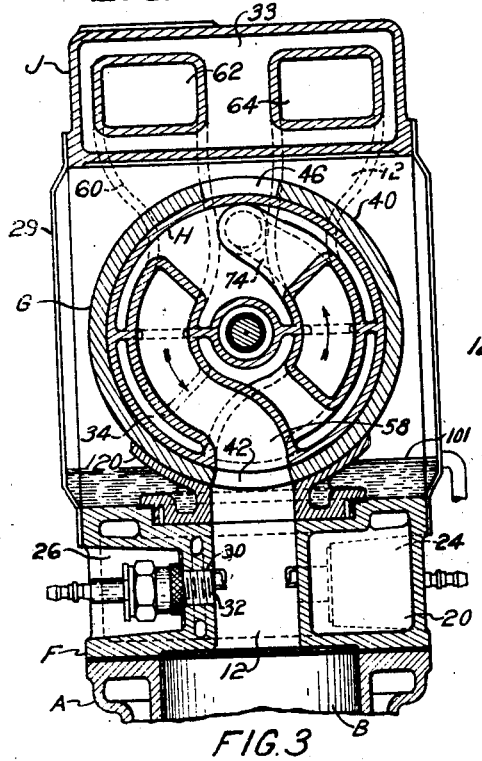
Figure 4:
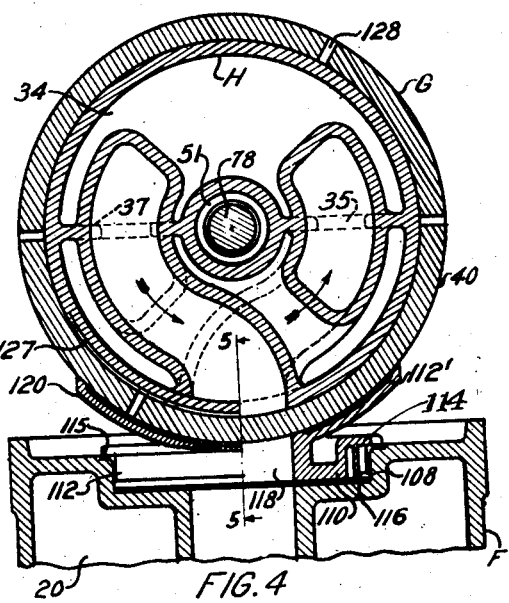

Other objects and advantages of the invention will become more readily apparent as the nature of the invention is better understood. In the illustrative embodiment of the invention which is shown in the accompanying drawings, Figure 1 is a fragmentary sectional view taken longitudinally through an internal combustion engine equipped with one form of the improved valve mechanism constructed in accordance with the principles of this invention, Figure 2 is a transverse sectional view taken substantially along the line 2—2 of Figure 1, Figure 3 is a transverse sectional view taken substantially along the line 3—3 of Figure 1, Figure 4 is an enlarged transverse sectional view of the valve assembly constructed in accordance with the principles of the sealing shoe of Figure 6 in section along the line 4—4 of that figure, Figure 5 is a sectional view taken substantially along the line 5—5 of Figure 4, Figure 6 is a top plan view of a sealing shoe constructed in accordance with the principles of this invention, Figure 7 is a top plan view of the engine partly in section, showing a form of manifolding and showing an external driving mechanism for the valve structure, and Figure 8 is a sectional view taken substantially along the line 8—8 of Figure 7.

Referring now to Figure 1, a cylinder block is designated at A. This block is of conventional design and is provided with a plurality of aligned cylinders, B, C, D, and E, having pistons mounted therein for reciprocation in the usual manner. For the purpose of simplified illustration, four cylinders have been shown, but it is to be understood that any number of cylinders may be employed either in parallel, V or in line without departing from the spirit of the invention. The cylinder block A is provided with a water jacket 10, which surrounds the cylinders and which forms a part of the circulatory water cooling system of the engine.

Mounted on the cylinder block A is a cylinder head F. This head may be secured to the block A, in any suitable manner, or if desired, the same may be integrally formed therewith. The cylinder head F is so constructed as to provide a plurality of combustion chambers 12, 14, 16, and 18, one for each cylinder. These combustion chambers are shown as being somewhat smaller in volume than the usual combustion chamber, considering the bore of the cylinders. The size and shape of the chambers however, may be varied to meet any requirements of higher or lower compression ratios to which the engine is designed. The cylinder head F is provided with a water jacket 20 surrounding the combustion chambers 12, 14, 16, and 18 and this water jacket communicates with the water jacket 10 in the cylinder block A by means of passages 22 provided through both the cylinder head and the cylinder block. The compartments which comprise the water jacket 20 are volumetrically larger than the compartments in the conventional type of cylinder head. In this manner not only is a greater cooling effect obtained, but by virtue of reduced size of the combustion chambers 12, 14, 16, and 18, greater compression of gases in these chambers is obtained. The cylinder head F is provided on opposite sides thereof with recesses 24 and 26 (shown in Figures 1 and 3) the bottom of which recesses are each provided with an opening 30, threaded to receive a standard spark plug 32. Two such spark plugs may be provided for each combustion chamber, thus making it possible to employ the dual ignition system now used on some engines.

Positioned upon the cylinder head F and secured thereto in any suitable manner, is a valve assembly G. This assembly in this particular instance is shown as being formed of two valve cores H and I, which are placed end to end and which extend horizontally of the engine, in parallelism with the crankshaft (not shown). It should be borne in mind however, that the valve assembly may be at an angle to the crankshaft and that a single unitary core member extending the entire length of the engine and serving the four or more cylinders B, C, D and E may be provided in place of the two symmetrical sections shown.

The sections or cores H and I are similar to each other but are symmetrical rather than identical. For the purpose of description, a detailed explanation of one of these parts, for example the part H, will suffice for the other.

The core H is stationary and is supported at its inner end by means of a removable saddle 28, (shown in Figures 1 and 2) which in turn is supported on the cylinder head F and bolted thereto. The removable saddle 28 extends from one side of the engine to the other and in addition to supporting the inner end of the cores H and I, provides means for attachment of a pair of cover plates 29 which enclose the valve mechanism later to be described. The outer end of the core H is enlarged to form the end support 31 which is supported on the cylinder head F and is adapted for connection to the exhaust and intake manifolds assembly J.

The valve core H is provided with a water jacket 34 which communicates with the water jacket 20 through a series of openings 36. The water jacket 34 is partitioned into an upper and lower space (shown in Figures 1, 3, and 4), by means of horizontal fins 37 formed in the core H and thus the water is caused to flow through the lower part of the core to its inner end and thence through an opening 35 provided in the fin 37 into the upper part of the core from whence it passes through openings 39 into the water jacket 33 in the manifold assembly J.

Positioned on the valve assembly G and secured thereto in any suitable manner is a manifold assembly J having intake and exhaust manifolds 62 and 64. This assembly is provided with a water jacket 33 (shown in Figures 1, 2, and 3) communicating with the water jacket 34 in the valve core H through the openings 39. Thus the water jacket 10 in the cylinder block A, the water jacket 20 in the cylinder head F, the water jacket 34 in the valve core H and the water jacket 33 in the manifold assembly J are all intercommunicating and form the circulatory water cooling system for the stationary and movable parts of the engine assembly.

The manifold assembly J is provided with a water outlet stem 36', adapted to be connected in the conventional manner with a hose coupling to the radiator (not shown).

The valve core H, which comprises one unit of the two part valve assembly is provided with a reduced portion 38 on which there is mounted a rotatable, ported, open ended, tubular valve 40. The valve 40 may be formed as a single integral tubular body or if desired, the same may be made as shown, in two sections 43 and 44 which occupy an end to end position on the core H and which are connected together by an interfitting coupling arrangement as shown at 45. The valve 40 is fitted to the reduced portion 38 of the core and is supported thereby. The valve is provided with a plurality of ports which extend through the cylindrical wall thereof. Certain of these ports are designated at 2, 46, and 47. The ports 42 and 46 appear in Figures 1 and 3, and are diametrically opposite to each other. These two ports comprise the intake ports for the combustion chamber 12. The core H is provided with a passage 58 which communicates with the valve ports 42 and 46 as the valve 40 rotates. Thus the passage 58 communicates with the combustion chamber 12 for the admission of combustible thereto when this passage is opened by the ports 42 and 46. The passage 58 communicates through a passage 60 with the intake manifold 62 (shown in Figures 1, 2, and 3) in the manifold assembly J.

Intake ports in the valve 44 serve the combustion chamber 14 in the same manner that the ports 42 and 46 serve the combustion chamber 12. Combustible is admitted to the combustion chamber 14 through a passage 66 in the core H. The passage 66 joins the passage 58 in the common intake conduit 60 which communicates with the intake manifold 62.

Exhaust ports 47 and 48, diametrically opposed in the wall of the valve 40 are adapted to successively communicate with an exhaust passage 68 formed in the core H. The passage 68 communicates at its upper end with the exhaust manifold 64 (shown in Figures 1, 2, and 3) in the manifold assembly J. In a similar manner, exhaust ports serve the combustion chamber 14 and relieve this combustion chamber of its exhaust gases through a pasage 70, in the core H. The exhaust passages 68 and 70 are joined in a common conduit 72 (shown in Figure 3) leading to the exhaust manifold 64.

The manifold assembly J, connects with the large outer ends 31 of the cores H and I to permit the flow of cooling water, combustible and exhaust gases. This manifold J also serves as a cover for the valves 40 and 41.

It is of course understood that the size of the various ports and their relative angular and longitudinal position in the wall of the cylindrical valve are calculated and determined by well known engineering principles and are so designed that as the valve is rotated a complete cycle will take place.

The intake ports 42 and 46 are in a different axial plane from the exhaust ports 47 and 48, but these planes are near enough together so that the combustion chamber 12, is served for both admission of combustible thereto and the exhaust of gases therefrom. Likewise the intake ports serving combustion chamber 14 are in an adjacent axial plane to the plane of the exhaust ports serving the same combustion chamber.

The core I is provided with passages similar in function to the passages 68, 58, 70, and 66 in the core H. Similarly, a tubular valve 41, is rotatably mounted on the core I between the removable bearing 28 and the enlarged outer end thereof which corresponds to the part 31 of the core H. The valve 41 is ported to register with the passages 68, 58, 70, and 66 to accommodate cylinders D and E. The passages and ports in the valve 41 and core I have applied thereto, reference numerals corresponding to their counterparts in the valve 40 and core H. The exhaust passage 72 in the core H is connected to its counterpart in the core I by means of a conduit 74. Similarly the intake passage 66, in the core H is connected to the intake passage in the core I by a conduit 76 which appears in Figures 1 and 2. By so joining the intake and exhaust passages which extend through the cores H and I, uniform conditions of combustible feed and a more rapid and complete exhaust may be obtained.

The ported valves 40 and 41 are driven in unison by any suitable driving means from the crankshaft. The specific type of connection employed is not of importance but in the present instance it is preferred to utilize a chain and sprocket drive 84 and 88 as shown. A shaft 78 extends longitudinally and centrally through the core H where it is supported for rotation in bearings 80. This shaft 78 projects into the core I a short distance and is supported therein in a bearing 82. The outer end of the shaft is provided with a sprocket 84 which is shielded by a flange 86 formed on the core H. A chain 88 extends around the sprocket 84 and also passes around a similar sprocket (not shown) mounted on the crankshaft. As shown in Figures 1 and 2, the shaft 78 has mounted thereon, a double gear 90. This gear when so mounted occupies a position between the two core members H and I, these two members being recessed to accommodate this gear therebetween. A pair of idler gears 92 and 94 are journalled between the core members H and I, the gear 92 meshing with one set of teeth on the double gear 90 and the gear 94 meshing with the other set of teeth. A second set of idler gears 96 and 98 (shown in Figure 2) are journalled between the cores H and I and occupy positions diametrically opposed to the gears 92 and 94 with respect to the gear 90. The inner ends of the valve 40 and 41 are provided with internal circumferential ring gears shown at 100 and 102 respectively. The diametrically opposed idler gears 92 and 96 are in mesh with the internal gear 100 on the valve 40 while the diametrically opposed idler gears 94 and 98 are in mesh with the internal valve gear 102. The double gear 90 is attached to the shaft 78 and as this gear rotates at the proper speed as determined by the chain and sprocket connection 84, 88 motion is imparted through the idler gears 92, 94, 96 and 98 to the valves 40 and 41a, to control the admission of motor fluid to and the exhaust of gases from, the various combustion chambers in the manner hereinbefore outlined.

In order to prevent loss of compression and explosion pressures around the valves 40 and 41a at the port openings and to reduce friction that would ordinarily exist between the valve and its support, each cylinder is provided with a sealing shoe 110, surrounding successive pairs of adjacent port openings in the valves. These sealing shoes appear in Figures 1, 3, 4, 5, and 6. The cylinder head F is provided with a plurality of depressions, all of which are identical and are designated at 108. These depressions are in the form of annular recesses around and above each combustion chamber. A sealing shoe is mounted within each depression 108 (shown in Figures 1 and 4). The sealing shoe 110 comprises a cylindrical portion 112 which is inserted in the depression 108. A flange 114 overlies the edge of the depression 108 and a thin flexible depending apron 116 extends downwardly from the flange 114 and has a slidable gas tight fit on the wall of the depression 108, thus providing gas pressure seal between the shoe and the cylinder head. Underlying the flange 114 and resting on the cylinder head F is a thin resilient undulated spring 115, which spring normally urges the sealing shoe upwardly against the valve and the valve against the core. The sealing shoe 110 is provided with a port opening 118 and this opening is sufficiently wide to accommodate adjacent intake and exhaust ports in the valves 40 and 41. The shoe is formed with a pair of integrally upwardly and outwardly extending curved sealing wings 120, which are adapted to bear against the underneath side of the valve 40 in the form of a cradle. To allow for expansion of the valve 40, the internal radius of curvature of the sealing wings 120 is slightly greater than the external radius curvature of the valve, thus rendering the sealing wing surface of the shoe slightly flatter than the external periphery of the valve. A slight clearance of approximately .002" is maintained at the tips of the wings. By such a construction more positive sealing is effected near the port in the sealing shoe. The pressure of the shoe against the tubular valve not only provides a tight seal between the shoe and the valve but also presses the valve 40 firmly against the core to provide tight sealing contact around the port opening in the core. Excessive pressures between the valve 40 and the sealing shoe are avoided by arrangements herein described.

In order to reduce the friction between the sealing shoe 110 and the valve 40 the cradle like wings 120 are provided with shallow troughs or depressions 112' on their inner surfaces which are best seen in Figures 4 and 6. The provision of such depressions in the wings 120 materially reduces the frictional area of contact between the shoe and the valve.

In order to advert any likelihood of binding of the valve 40, means is provided for reducing the bearing pressure between the valve 40 and the shoe 110 and also between the valve and the core H. Toward this end transverse groove 124 extends circumferentially along the edges of the oppositely directed sealing wings 120 and on opposite sides of the opening 118. These grooves communicate with the opening 118 through ducts 126 in order that cylinder gas pressure may be built up within the same. The outer surface of the core H is provided with a plurality of grooves, one of which appears in Figures 5 and 6 at 127. Extending through the valve 40 are plurality of radial holes 128 which when in register with ducts 124 of the sealing shoe permit the pressure built up in the grooves 124 to pass through the valve to the interior thereof and into the grooves 127 to equalize the pressure on the inside and outside of the valve and thus obtain a balanced condition that is conducive toward reducing friction by virtue of a reduction in the bearing pressure between the shoe and the valve and the valve and the core.

The central drive shaft bearing portion 49 of the core H provides an oil space around the drive shaft 78. The drive shaft is in the present instance, concentric with the core, but the same may be eccentrically positioned if desired. In the case of the core I, since the shaft 78 extends but a short way into this core, a hollow space 51 exists. This space 51 communicates through an opening 53 with an oil line 55 through a standard type of oil fitting 57. Lubricant is forced into the space 51 from whence it may pass through holes in shaft 78 to the bearings 82 and 80. Downwardly extending ducts 59 carry the lubricant to the inner surfaces of the valves 40 and 41 from whence it may pass through splines 45 to the outer side of the valve to thoroughly lubricate the same, and to lubricate the sealing shoes in which it is cradled.

The lubricant may collect on the cylinder head F at the level shown in Figure 3 at 101 and thus the valves 40 and 41 as they rotate dip into the oil and are lubricated and cooled by the oil accumulated around the sealing shoes on the cylinder head.

In the form of the invention shown in Figures 7 and 8, a cylinder block assembly and a cylinder head assembly, designated in their entireties at A' and F'' respectively, are substantially identical with the corresponding assemblies A and F in the form of the invention described above. Supported on the cylinder head assembly F'' is a valve assembly G' comprised of two similar valve cores H' and I' placed end to end. A suitable cover 8 is received on the cylinder head F'' and serves to cover the entire valve assembly G'. The cores H' and I' are substantially the same as the cores H and I with the single exception that the central bearings and lubricating sheathe for the shaft 37 have been omitted and a web 3 connects the intake and exhaust passages 6 and 7 which extend through these cores. Each core carries a sleeve valve, which valves are shown at 9 and 11 and are similar to the valves 40 and 41 and serve to control the admission of combustible to and the exhaust of spent gases from the cylinders in the block A'. Sealing shoes assemblies 13 carried in the cylinder head F'' and identical with the sealing shoe assemblies 110, serve to balance the valves and prevent loss of pressure therearound.

The enlarged heads of the cores H' and I' have secured thereto an intake manifold 15 on one side of the engine and an exhaust manifold 17 on the other side. These manifolds communicate with the interior of the combustion chambers in proper timed relation through the ports provided in the valves 9 and 11 in the manner described in connection with the form of the invention already described.

The valves 9 and 11 are driven from the crankshaft of the engine (not shown) through a train of gears. Toward this end a vertical shaft 21, which receives its rotary motion from the crankshaft is provided with a worm 23 which meshes with a gear 25, mounted on a horizontal shaft 27 which is journalled in bearings 29. The shaft 27 is disposed in close parallel relation to the valves 9 and 11 and has mounted thereon a pair of gears 31 and 33 which mesh with external circumferential ring gears 35 and 37 respectively on the valves 9 and 11. Thus it will be seen that the valves 9 and 11 are driven in unison and the same smooth and efficient operation that is obtained in the other form of the invention is herewith made possible.

While we have shown a preferred form of embodiment of the invention, it is to be understood that many modifications may be made therein without departing from the spirit thereof, and we therefore desire a broad interpretation of the principles of the invention, as disclosed hereinbefore and as claimed hereinafter.

We claim:

1. The combination with a unit of the class described having a plurality of successively operative cylinders, a piston in each cylinder, and a crankshaft operatively connected to said pistons, of a substantially cylindrical ported core having its longitudinal axis disposed substantially parallel to the longitudinal axis of said crankshaft, a ported tubular valve mounted for rotation directly on and in sealing contact with said core throughout its whole effective sealing length and adapted upon rotation thereof to control the admission of fluid to and the exhaust of fluid from said cylinders, said core forming the sole support for said valve, and means operative at all times pressing said valve against said core adjacent the point of registry of said port openings to provide a sealing contact around the port openings in the core.

2. The combination with a unit of the class described having a plurality of successively operative cylinders, a piston in each cylinder and a crankshaft operatively connected to said pistons, of a substantially cylindrical ported core having its longitudinal axis disposed substantially parallel to the longitudinal axis of said crankshaft, a ported tubular valve mounted for rotation on said core and adapted upon rotation thereof to control the admission of fluid to and the exhaust of gases from said cylinders, said core forming the sole support for said valve, fluid means for cooling said core, and means operative at all times pressing against said valve toward said core adjacent the ported area of the same to seal the ports against the escape of fluid therearound.

3. The combination with a unit of the class described having a plurality of successively operative cylinders, a piston in each cylinder and a crankshaft operatively connected to said pistons, of a substantially cylindrical ported core having its longitudinal axis disposed substantially parallel to the longitudinal axis of said crankshaft, a ported tubular valve mounted for rotation on said core and adapted upon rotation thereof to control the admission of fluid to and the exhaust of fluid from said cylinders, said core forming the sole support for said valve, and means whereby fluid pressure is used for pushing said valve against said core adjacent the ported area of the same to seal the ports in the core on the side adjacent the cylinders.

4. The combination with an internal combustion engine having a plurality of successively operative cylinders, a piston in each cylinder and a crankshaft operatively connected to said pistons, of a substantially cylindrical ported core having its longitudinal axis disposed substantially parallel to the longitudinal axis of said crankshaft, a ported tubular valve mounted for rotation on said core and adapted upon rotation thereof to control the admission of motive fluid to and the exhaust of gases from said cylinders, said core forming the sole support for said valve, and means for entrapping pressure fluid resulting from the explosion of gases in said cylinders and for confining and applying the same to the outer surface of said valve adjacent the ported area of said core to force the valve against said area and seal the ports thereof adjacent the cylinders.

5. The combination with a unit of the class described having a plurality of successively operative cylinders, a piston in each cylinder and a crankshaft operatively connected to said pistons, of a substantially cylindrical ported core having its longitudinal axis disposed substantially parallel to the longitudinal axis of said crankshaft, a ported tubular valve mounted for rotation on said core and adapted upon rotation thereof to control the admission of fluid to and the exhaust of fluid from said cylinders, said core forming the sole support for said valve, and means providing a pocket for confining pressure fluid and applying the same to the outer surface of said valve throughout a restricted area of the same in the vicinity of the ports in said core to seal the ports at the side of the core adjacent the cylinder.

6. The combination with a unit of the class described having a plurality of successively operative cylinders, a piston in each cylinder and a crankshaft operatively connected to said pistons, of a substantially cylindrical ported core having its longitudinal axis disposed substantially parallel to the longitudinal axis of said crankshaft, a ported tubular valve mounted for rotation on said core and adapted upon rotation thereof to control the admission of fluid to and the exhaust of fluid from said cylinders, said core forming the sole support for said valve, a sealing shoe bearing against said valve adjacent the ported area of said core and means for forcing said shoe into engagement with said valve to force said valve against said core adjacent the ported area thereof.

7. The combination with a unit of the class described having a plurality of cylinders, of a core having passages therein leading from a source of fluid supply to said cylinders, a rotary sleeve valve mounted on said core and provided with ports for controlling the admission of fluid to said cylinders from said passages, a shaft extending longitudinally through said core, an internal gear on said valve, gear means on said shaft cooperating with said internal gear for rotating said valve, and means for driving said shaft from the crankshaft.

8. The combination with an internal combustion engine having a plurality of cylinders, pistons mounted in said cylinders and a crankshaft operatively connected to said pistons, of a plurality of cores having their axes arranged parallel to the axis of said crankshaft and arranged in end to end relationship, there being passages in each of said cores for supply fuel to said cylinders, and additional passages for conducting exhaust gases therefrom the fuel supply passages of each core being connected to receive fuel independently of the passages of the other core, a rotatable ported valve mounted on each core and adapted upon rotation thereof to control the admission of fuel to and the exhaust of gases from said cylinders through said passages, and means for driving said valves in unison.

9. The combination with an internal combustion engine having an exhaust manifold and an intake manifold, a cylinder block, a plurality of combustion chambers therein and a crankshaft, of a valve core in the form of a tubular member having its axis disposed substantially parallel to the axis of said crankshaft, said core having an enlarged head adapted for attachment to said manifolds, and for supporting said core on the cylinder block, passages extending through said core and said enlarged head in communication with said manifolds and with the combustion chamber for the admission of motive fluid to and the exhaust of spent gases therefrom, and a rotatable ported tubular valve mounted on said core and adapted upon rotation thereof to control such admission and exhaust.

10. The combination with an internal combustion engine having an exhaust manifold and an intake manifold, a cylinder block, a plurality of combustion chambers therein and a crankshaft, of a pair of valve cores in the form of tubular members arranged in end to end relationship with their axes parallel to the axis of said crankshaft, said cores each having an enlarged head adapted for attachment to said manifolds, and for supporting said cores on the cylinder block, intercommunicating passages extending through said cores in communication with said manifolds and with the combustion chamber for the admission of motive fluid to and the exhaust of gases therefrom, a rotatable ported tubular valve mounted on each core and adapted upon rotation thereof to control such admission and exhaust, and means for centering and supporting the adjacent ends of said cores on said cylinder block.

11. In an internal combustion engine having a cylinder head, a plurality of combustion chambers, intake and exhaust manifolds and a crankshaft, a pair of ported tubular valve cores arranged in end to end relationship with their axes parallel to the axis of said crankshaft, the outer ends of said cores being enlarged and supported on said cylinder head and adapted for attachment to said manifolds, a saddle for centering and supporting the inner ends of said cores and a rotatable ported tubular valve supported on said core.

12. The combination with an internal combustion engine having an exhaust manifold and an intake manifold, a cylinder block, a plurality of combustion chambers therein and a crankshaft, of a pair of valve cores in the form of tubular members arranged in end to end relationship with their axes parallel to the axis of said crankshaft, and cores each having an enlarged head adapted for attachment to said manifolds, and for supporting said cores on the cylinder block, passages extending through said cores in communication with said manifolds and with the combustion chamber for the admission of motive fluid to and the exhaust of gases therefrom, a rotatable ported tubular valve mounted on each core and adapted upon rotation thereof to control such admission and exhaust, and means for centering and supporting the adjacent ends of said cores on said cylinder block.

13. The combination with a unit of the class described having a plurality of cylinders, pistons mounted in said cylinders and a crankshaft operatively connected to said pistons, of a plurality of cores arranged in end to end relationship, passages in said cores for supplying fluid to said cylinders, and additional passages for conducting exhaust fluid therefrom, the exhaust fluid passages in said cores being intercommunicating, a rotatable ported valve mounted on each core and adapted upon rotation thereof to control the admission of fluid to and the exhaust of fluid from said cylinders through said passages, and means for driving said valves in unison.

14. The combination with a unit of the class described having a plurality of cylinders, and pistons mounted in said cylinders, of a plurality of cores arranged in end to end relationship, there being passages in said cores for conducting exhaust fluid from said cylinders and a rotatable ported valve mounted on each core and adapted upon rotation thereof to control the exhaust of fluid from said cylinders, through said passages, the passages in each core communicating with each other but arranged to discharge the exhaust fluid at their remote ends.

15. The combination with a unit of the class described having a plurality of cylinders, pistons mounted in said cylinders, and a crankshaft operatively connected to said pistons, of a plurality of cores arranged in end to end relationship there being passages in said cores for conducting exhaust fluid from said cylinders, a rotatable ported valve mounted on each core and adapted upon rotation thereof to control the exhaust of fluid from said cylinders through said passages, a shaft journalled in said cores, said valves having internal gears formed thereon, gears connecting said shaft and said internal gears and adapted upon rotation of the shaft to drive said valves in unison and a driving connection between said shaft and the crankshaft.

16. The combination with a cylinder head having a combustion chamber therein, of a core presenting an intake and an exhaust passage to said combustion chamber, a valve rotatably mounted on said core and having ports adapted upon rotation of the valve to control the admission of fluid to and the exhaust of gases from said combustion chamber through said passages, a sealing shoe for said valve having an opening through which said passages communicate with the combustion chamber, said shoe providing a cradle adapted to bear against said valve, a groove in said shoe permitting pressure from said combustion chamber to enter between said shoe and valve to urge said valve against the ported area of said core, a shallow groove formed in said core between the same and said valve, said valve having ports adapted upon rotation of the valve to momentarily connect said grooves to permit pressure fluid to enter the second groove from the first to partially counter-balance the effect of pressure in said first mentioned groove and thereby reduce the friction between said valve and core.

17. In an internal combustion engine, a cylinder block having cylinders therein, a cylinder head mounted on said cylinder block and having combustion chambers therein, a stationary core having passages therethrough, mounted on said cylinder head, a rotatable tubular valve mounted on said core and having ports therein controlling the admission of motive fluid to and the exhaust of gases from said combustion chamber through said passages, and a manifold assembly having intake and exhaust manifolds communicating with said passages mounted on said core and forming a cover for the same and for said valve.

18. In an internal combustion engine, a cylinder block having cylinders therein, a cylinder head mounted on said cylinder block and having combustion chambers therein, a stationary core having passages therethrough and having enlarged ends mounted on said cylinder heads, a rotatable tubular valve mounted on said core and having ports therein controlling the admission of motive fluid to and the exhaust of gases from said combustion chambers through said passages in the core, and a manifold assembly having intake and exhaust manifolds communicating with said passages mounted on said core and forming a cover for the same and for said valve, said cylinder block, cylinder head, core and manifold assembly having intercommunicating water jackets therein providing a circulatory water system for the engine.

19. The combination with a unit of the class described having a plurality of successively operative cylinders, a piston in each cylinder and a crankshaft operatively connected to said pistons, of a ported tubular valve having its longitudinal axis disposed substantially parallel to the longitudinal axis of said crankshaft and adapted upon rotation thereof to control the admission of fluid to and the exhaust of fluid from said cylinders, a hollow core extending through said valve and supporting the same throughout and providing a substantially continuous bearing on which the valve rotates, with means to seal said valve against the escape of gases adjacent said cylinders including springs pressing the valve against the core to provide a seal around the port in the core, and means for cooling said core.

JOSEPH A. ANGLADA.
AXEL H. ASPROOTH.

CERTIFICATE OF CORRECTION.

Patent No. 2,109,608.                                             March 1, 1938.

JOSEPH A. ANGLADA, ET AL.

It is hereby certified that error appears in the printed specification of the above numbered patent requiring correction as follows: Page 6, second column, line 67, claim 19, for the word "gases" read fluid; and that the said Letters Patent should be read with this correction therein that the same may conform to the record of the case in the Patent Office.

Signed and sealed this 19th day of April, A. D. 1938.

(Seal)

Henry Van Arsdale,
Acting Commissioner of Patents.